United States Patent [19]

Levran et al.

[11] Patent Number: 5,521,811
[45] Date of Patent: May 28, 1996

[54] HIGH EFFICIENCY AC TO DC POWER CONVERSION SYSTEM

[75] Inventors: Alexander Levran, Los Angeles; Joseph M. Nowosielski, Laguna Hills; Giao M. Ton-That, Mission Viejo; Ramamoorthy Rajagopalan, Irvine, all of Calif.

[73] Assignee: Square D Company, Palatine, Ill.

[21] Appl. No.: 304,723

[22] Filed: Sep. 12, 1994

Related U.S. Application Data

[60] Division of Ser. No. 951,208, Sep. 25, 1992, which is a continuation-in-part of Ser. No. 935,041, Aug. 25, 1992, Pat. No. 5,414,609.

[51] Int. Cl.$^6$ .......................... H02M 1/00; H02M 5/458
[52] U.S. Cl. .......................... 363/144; 363/141; 363/37; 174/133 B; 174/ 72 B
[58] Field of Search .............................. 363/140, 60–63, 363/144, 132, 56, 137, 141; 307/109–110; 320/1; 361/637; 174/72 B, 68.2, 99 B, 129 B, 133 B

[56] References Cited

U.S. PATENT DOCUMENTS

| | | | |
|---|---|---|---|
| 5,132,896 | 7/1992 | Nighizawa et al. | 363/144 |
| 5,172,310 | 12/1992 | Deam et al. | 363/144 |
| 5,365,424 | 11/1994 | Deam et al. | 363/144 |

*Primary Examiner*—Peter S. Wong
*Assistant Examiner*—Aditya Krishnan
*Attorney, Agent, or Firm*—Richard J. Graefe; Michael J. Femal; Larry I. Golden

[57] ABSTRACT

The present invention locates the primary winding of a transformer in a configuration where it substantially surrounds the secondary winding of the transformer in order to enhance the efficiency of the electromagnetic coupling. High magnetic permeability material surrounds portions of the primary winding of the transformer. The transformer is designed to efficiently operate at frequencies of approximately 50 kilohertz. In one preferred embodiment, the primary winding of the invention is formed of two U-shapes in which the parallel members of the U are substantially longer than the bottom portion of the U. The two U-shapes form a rectangular shape and the substantially parallel rectangular portions are surrounded by high magnetic permeability material to further enhance the electromagnetic coupling between the primary coil winding and the secondary coil winding. In another embodiment, the primary winding of the invention may be rectangular in shape. A strip line layout of the output of the secondary is formed of conductive and insulating layers laminated together. A power bus is configured to have a distributed inductance and is formed of two planer conductors to create a distributed capacitance which substantially cancels the effect of the distributed inductance.

16 Claims, 3 Drawing Sheets

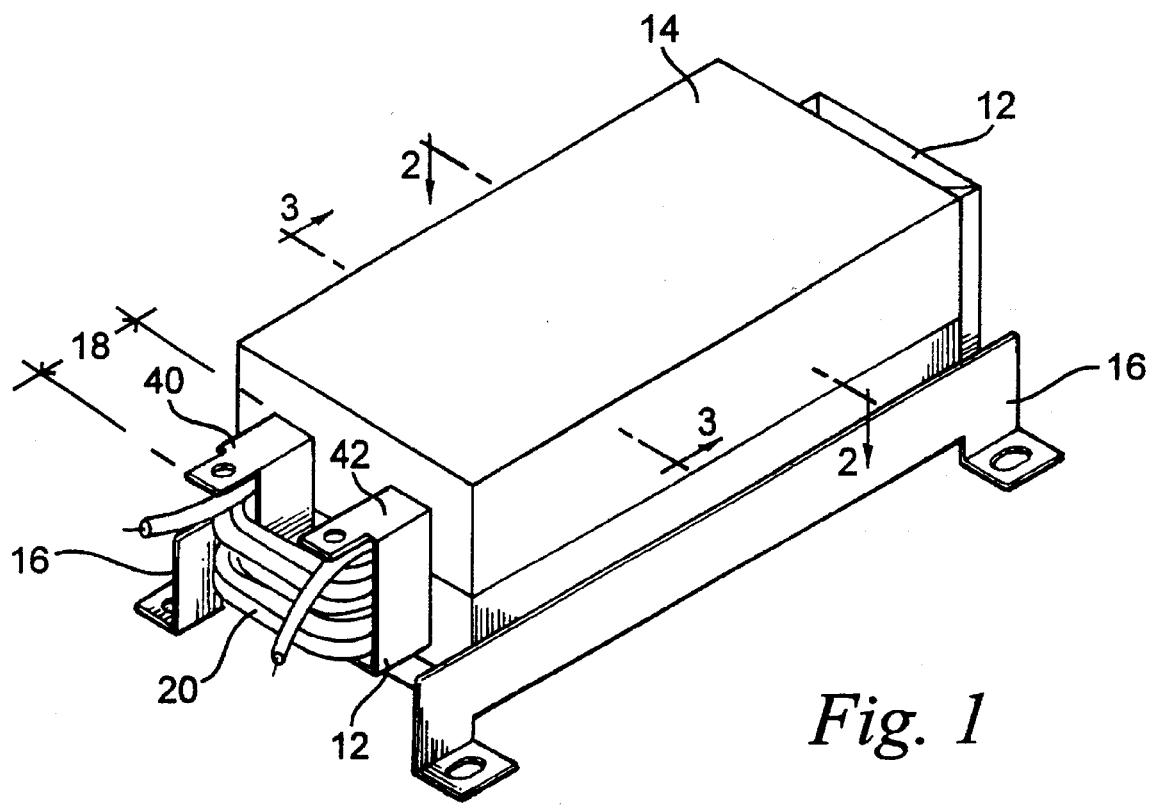
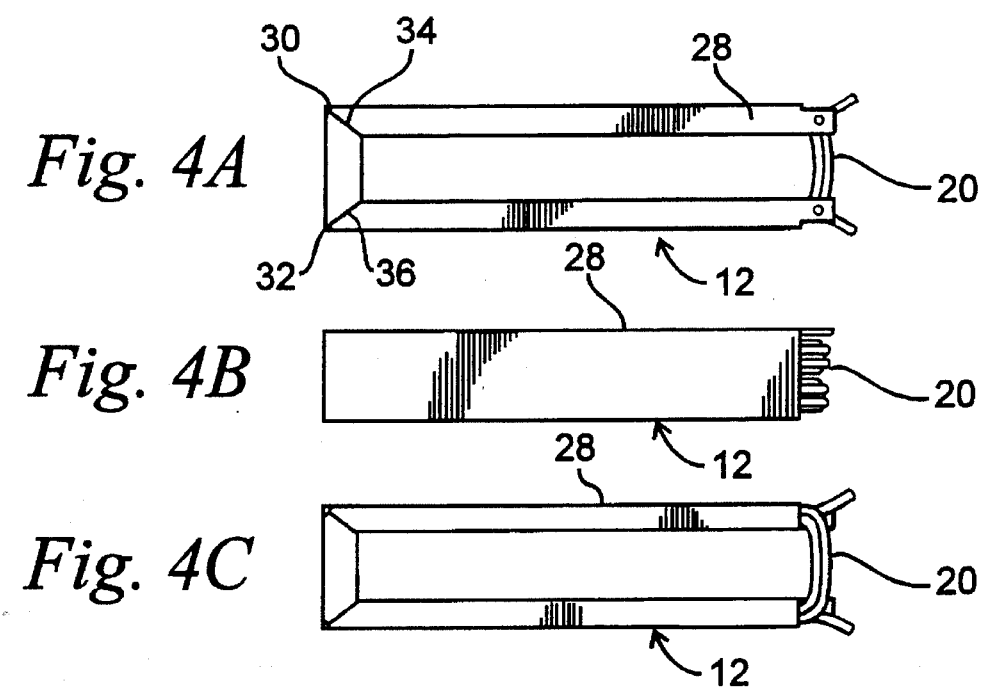
*Fig. 1*
*Fig. 4A*
*Fig. 4B*
*Fig. 4C*

HIGH EFFICIENCY AC TO DC POWER CONVERSION SYSTEM

This is a divisional of U.S. application Ser. No. 07/951,208 filed Sep. 25, 1992, which is a continuation in part of U.S. application Ser. No. 07/935,041 filed Aug. 25, 1992, U.S. Pat. No. 5,414,609.

FIELD OF THE INVENTION

The present invention generally relates to high efficient transformers for energy coupling, more specifically to transformers operating at relatively high frequencies.

BACKGROUND OF THE INVENTION

Transformers enjoy widespread use as energy coupling devices. Most transformers have a primary and a secondary winding. Some transformers have multiple secondary windings, and some have multiple taps on a single secondary winding. A particular interest here are transformers having a single primary winding, and a single secondary winding.

Transformers typically provide isolation between the input signal applied to the primary winding, and the output signal which results on the secondary winding. Varying degrees of isolation are provided by each transformer based on the frequency response of the primary and secondary windings. Transformers also enable a user to easily increase or decrease the voltage level by varying the ratio of the number of turns contained in the primary winding with respect to the number of turns contained in the secondary winding. Classic examples of this include the use of a transformer in a television set to generate high voltages which are applied between the electron gun and the phosphor screen of the cathode ray tube. These are typically referred to as flyback transformers, and have a large difference in the turns ratio of the primary and secondary coils. The primary winding typically contains one or two turns of a coil which pass through the coil of a secondary winding having more than 10 times as many turns. This is necessary in order to increase the voltage across the secondary of the transformer to 10,000 to 50,000 volts from an input winding which has approximately 330 volts (peak to peak) applied across it (this corresponds to 110–120 volts RMS which is typically provided in a household appliance outlet.

Other applications of transformers include step down transformers which supply power to low power devices such as battery chargers, toys, and computer peripherals. For a time these were referred to as filament transformers because they provided a voltage suitable to drive the filament of a vacuum tube. Step down transformers of this type typically reduce the incoming AC signal of approximately 330 volts AC (peak to peak) to 8 volts (peak to peak), or 12 volts (peak to peak). A rectifier or other appropriate low voltage AC to DC converter then provides the required DC wave form to operate the particular toy or appliance.

Additionally, transformers employ a wide range of coupling techniques. Flyback transformers are typically formed by first wrapping a tightly wound secondary coil around a central bobbin which is between ¼ and 1 ½ inches in diameter. The wire that forms the secondary transformer is referred to as Formvar wire and is typically a copper wire which is coated with varnish, shellack, or another insulating substance. Aluminum wire is used in some applications. The bobbin is then removed, and the entire secondary winding is covered with a protective coating such as a high temperature wax, or various cloth or mylar tapes which are then coated with varnish or shellack. This maintains the form of the secondary winding. A primary winding is formed by passing a piece of wire once or twice through the center of the secondary winding. This primary winding is wrapped loosely around the secondary winding. The diameter of the wire of the secondary winding varies from approximately 22 gage to 12 gage depending on the particular application. The primary winding wire is typically coated with plastic or other suitable, relatively heavy duty insulator.

Coupling material may be added to enhance the efficiency of operation of the transformer. In the flyback transformer, no coupling material is usually inserted in between, or surrounding either the primary or secondary coils.

In other types of transformers, including certain filament transformers, the primary and secondary windings are each formed in the same manner as the secondary winding for the flyback transformer. Both of these windings are then placed around a ferrite core which provides magnetic coupling between the two windings. In some configurations, the windings are further encased in ferrite or iron material in order to enhance the coupling of the primary and secondary windings to provide greater efficiency in the transfer of energy between the primary and secondary windings.

Designing transformers also involves accepting a trade off in certain operating parameters. Electromagnetic coupling is typically more efficient at higher frequencies. Unfortunately, the inductive characteristics of the wire used tend to decrease the efficiency of the wire as the frequency increases. Additionally, ferrite material which is typically used as a core provides a greater efficiency for magnetic coupling at lower frequencies, and a poorer efficiency at higher frequencies due to the increased rate of change of the magnetic field. Thus, most transformer designs make strategic trade offs between the operating frequency and materials used to construct the transformer.

Design of high frequency transformers is difficult, and is usually hampered by the parasitic characteristics presented by the conductive material used to form the primary and secondary windings. The coupling material also presents difficulties in use.

SUMMARY OF THE INVENTION

It is therefore an object of the present invention to provide a transformer design which operates efficiently at high frequencies.

It is a further object of the present invention to provide a transformer which has a highly efficient energy coupling between the primary and secondary coils.

It is a further object of the present invention to provide a transformer design which is easy to fabricate and uses inexpensive, readily available materials.

It is a further object of the present invention to provide a transformer design which minimizes the physical size of the transformer.

It is a further object of the present invention to provide a transformer design in which the transformer can be readily electrically connected to the input and output signals without adding parasitic losses as a result of the interconnection.

It is a further object of the present invention to provide a transformer design which minimizes the parasitic losses associated with the primary and secondary windings.

It is a further object of the present invention to provide a transformer design which reduces the amount of heat generated by inefficiencies in the electromagnetic coupling of the primary and secondary windings.

It is a further object of the present invention to provide a layout of the output circuitry of the transformer that minimizes losses due to the physical configuration of the layout and frequency and power components applied by the output of the transformer.

The present invention employs a rectangular design in which a secondary coil is encased within a copper channel which forms the primary coil winding. This assembly is laminated in order to maintain the relative positions of the primary and secondary windings in a constant relationship to each other. This assembly is substantially surrounded by high magnetic permeability material which extends nearly the entire length of the integral coil assembly formed by the primary coil winding and the secondary coil winding.

The majority of the length of the integral coil assembly is enclosed within the high magnetic permeability material. The portion of the integral coil assembly which is perpendicular to the length of the integral coil assembly is not surrounded by high magnetic permeability material, and extends slightly beyond the high magnetic permeability material. This minimizes interference between the electromagnetic signals generated in the primary and secondary coils of the portion of the integral coil assembly that runs across the width of the transformer and the electromagnetic pattern generated by the portion of the integral coil assembly which runs the length of the transformer.

This also allows cooling of the integral coil assembly which would not otherwise be achieved because of the surrounding high magnetic permeability material. The high magnetic permeability material is varnished or shellacked to hold it in place surrounding the integral coil assembly. Electrical contacts for the primary coil winding and the secondary coil winding extend from one end of the length of the transformer and provide for direct mounting of the transformer on a bus bar or other power distribution arrangement minimizing the need for additional interconnection which is undesirable at high frequencies.

The output of the transformer is routed to a wave form conversion circuit through a power bus which is laid out using stripline techniques to cancel inductance of the power bus and integrate capacitor and inductor characteristics into the bus structure to minimize the parasitic effect which would otherwise be observed. The power bus is comprised of alternating layers of conductors and insulators with each conductive layer being the thickness of approximately two skin depths, as calculated by the operating frequency and power factor.

BRIEF DESCRIPTION OF THE DRAWINGS

FIG. 1 is a perspective view of the transformer of the present invention.

FIG. 4a is a bottom view of the primary winding of the transformer shown in FIG. 1.

FIG. 4b is a side view of the primary winding of the transformer shown in FIG. 1.

FIG. 4c is a top view of the primary winding of the transformer as shown in FIG. 1.

DETAILED DESCRIPTION OF THE PREFERRED EMBODIMENT

Referring to FIG. 1, a preferred embodiment of the present invention is formed by placing a primary winding surrounding a secondary winding inside a high magnetic permeability housing. Primary winding 12 is rectangular in shape and runs the length of the transformer. Portion 18 of primary winding 12 extends beyond high magnetic permeability material 14 to allow the transformer to dissipate heat which would otherwise be contained within high magnetic permeability housing 14, and to prevent an electromagnetic field from being established within high magnetic permeability material 14 which is perpendicular to the electromagnetic field generated by the lengthwise segment of primary winding 12. Bracket 16 provides for mounting of the transformer in an appropriate location on a circuit assembly.

Figure 2:
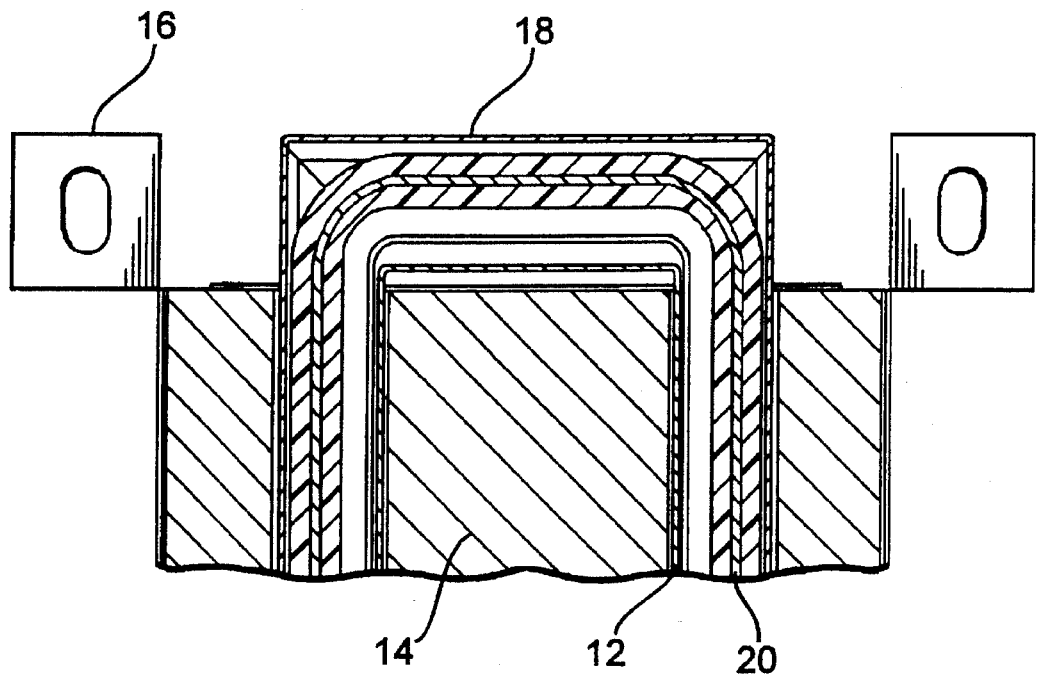
FIG. 2 is a top view of the end of the transformer shown in FIG. 1.

Referring to FIG. 2, the secondary winding 20 is shown as it rests within the channel defined by primary winding 12. High magnetic permeability material 14 surrounds the portion of the transformer which runs lengthwise. The section of primary winding 12 which is not enclosed within high magnetic permeability material 14 is more clearly shown than in FIG. 1. This portion 18 of primary winding 12 is spaced apart from high magnetic permeability material 14. Secondary coil winding 20 remains contained within primary coil winding 12 through Section 18 of primary coil winding 12.

Figure 3:
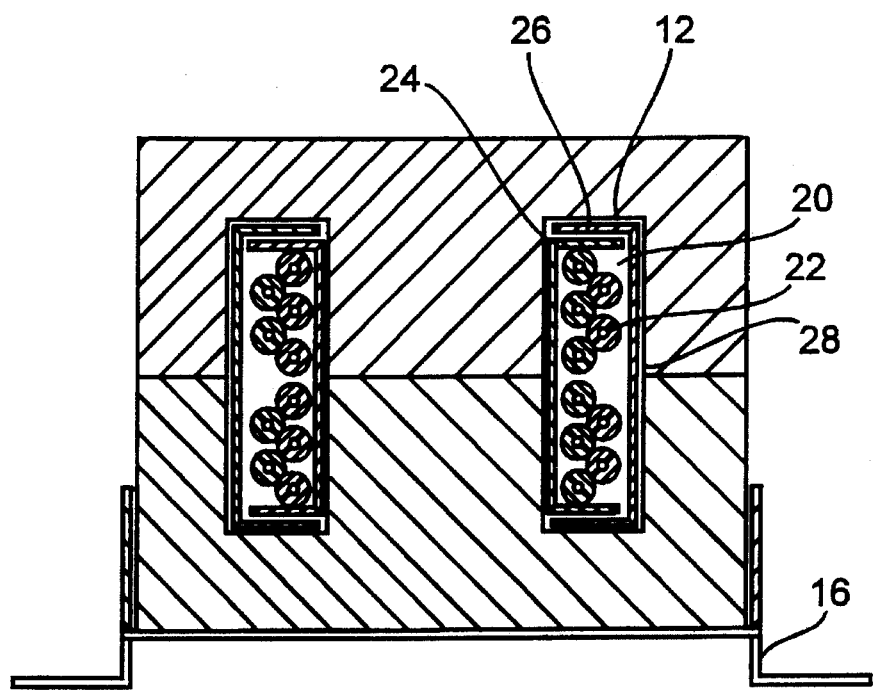
FIG. 3 is a cross-sectional view of the transformer shown in FIG. 1.

Referring to FIG. 3, the individual wires 22 of coil winding 20 are shown as they are contained within the cross-section of primary coil winding 12. Primary coil winding 12 is made up of several u-shaped channels 24, 26, and 28 which surround secondary coil winding 20. U-shaped member 26 surrounds the portion of secondary winding 20 on the side of secondary winding 20 which is opposite u-shaped member 24. Similarly, material 28 surrounds u-shaped material 26. Preferably, u-shaped material 24, 26, and 28 are copper strips approximately 0.032 inches thick formed of a dead soft grade copper, type CU110. This results in a highly conductive, low resistivity primary coil winding 12.

The channel member illustrated in FIGS. 4a–c is the outside, surrounding member 28 which surrounds U-shaped members 24 and 26. The corner portions 30 of channel members 24, 26, and 28 are formed by notching and bending continuous strips of copper material. Corners 30 and 32 are necessary to establish the shape of primary winding 12. Corners 30 and 32, as well as joints 34 and 36 are soldered in order to enhance the electrical continuity of the channel member 28 and then ground smooth in order to avoid generating spurious electromagnetic fields. Grinding the joints smooth also allows viewing joints 34 and 36 to ensure that a good solder contact has been created during the manufacturing process. This ensures consistent quality of the finished product and repeatable characteristics of the transformers as they are manufactured in large quantity.

Secondary coil winding 20 is made up of a number of coils of wire 22 which are made about a bobbin or form.

The particular high magnetic permeability materials selected for use in preferred embodiments of the present invention are: a series #75 type material and a transformer core material M3C85 from Phillips Corp. Numerous other types of high magnetic permeability material exist with characteristics similar to series E75, and can be readily employed in the present invention. The particular wire 22 selected is round Litz (Nelc660/38SPDN) having a outer diameter of approximately 0.150 inches. Coil 20 is formed by 10 turns of wire 22 arranged in the configuration as shown in FIG. 3. The inventors recognize that numerous other types of wire, including varying thicknesses of the core, varnish coating, conductivity of the wire, conductor material and number and orientation of the windings of the secondary coil can be employed. The particular selection of the number of secondary windings depends on the desired transforming ratio.

One preferred embodiment of the present transformer has an overall length of approximately 5½ inches including mounting brackets 16, and is approximately 2.4 inches wide, not including mounting bracket 16. The overall height of the transformer of the preferred embodiment is approximately 2.3 inches, not including mounting bracket 16. The primary coil winding is approximately 0.45 inches wide and 1.8 inches high and is formed in a U-shape with Section 18 representing the base of the U.

The preferred transformer design enables superior operation and highly efficient energy transfer from the primary winding to the secondary winding at high frequencies, typically in the area of 50 kilohertz. This operating range is difficult for prior art transformers to achieve because of the high frequencies involved, and the parasitic effects of most primary and secondary coil windings, and the high magnetic permeability material that couples them together. The present invention provides superior operating results by substantially encapsulating the secondary coil winding within the primary coil winding, creating an integral coil assembly.

By surrounding the length of the integral coil assembly with high magnetic permeability material, the flux linkage capabilities of the present transformer are enhanced. This enhancement is effective as long as the flux linkage is only in one plane, or direction. By locating the segment of the integral coil assembly which is perpendicular to the length of the integral coil assembly outside of the high magnetic permeability material, any interference which may be introduced by generating an electromagnetic field in the portion of the integral coil assembly which is perpendicular to the electromagnetic field generated by the length of the integral coil assembly is minimized.

Additional benefits of locating this portion of the integral coil assembly outside of the high magnetic permeability material include the ability of the integral coil assembly to rapidly cool, dissipating the heat generated by the inefficiencies in coupling the electromagnetic signal created in the primary 12 of the integral coil assembly with the secondary 20 of the integral coil assembly. A minimum amount of energy loss between the primary and secondary coil windings is expected as the magnetic alignment of the atoms within the coil elements is rapidly changed.

Surrounding the integral coil assembly with high magnetic permeability material enhances the flux coupling between the primary and secondary windings, but limits the surface area available to dissipate heat. Additionally, most high magnetic permeability material has a relatively high thermal resistance and generates a thermal gradient between the outer layer 28 of the integral coil assembly and the outside surface of high magnetic permeability material 14. This thermal gradient can become quite large depending on the selection of materials.

It is desirable to minimize the temperature at which the transformer of the present invention operates. Electromagnetic coupling is more efficient when the windings are operating at low temperatures. This is in part because the entropy of the atomic structure of the coil windings is less, making it easier to alter their magnetic alignment without undue energy loss. As previously stated, forcing the atomic particles of the primary and secondary windings to alter their magnetic orientation generates a certain amount of interatomic friction. This friction is exhibited as heat produced by the transformer. Additionally, the resistance (R) of each of the coil windings will contribute to a power (IR) drop which exhibits itself as joule heating.

Figure 5:
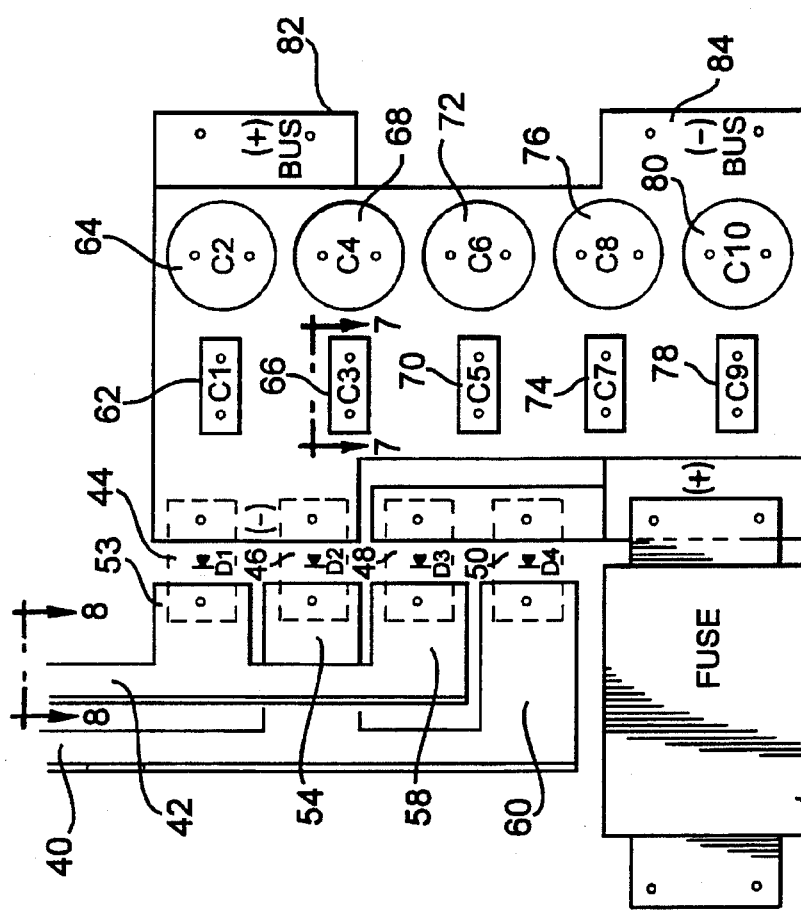
FIG. 5 is a top view of the layout of the power conversion system attached to the transformer.
Figure 6:
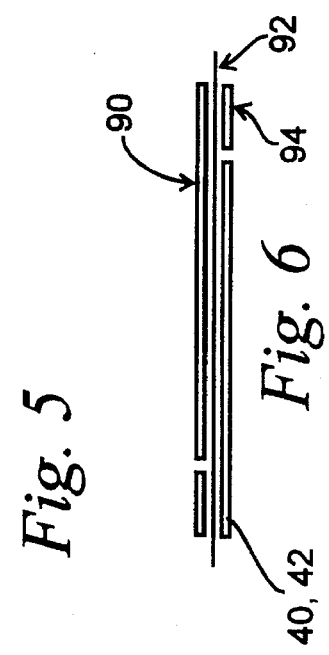
FIG. 6 shows the lamination of the conductors forming the bus members.

Referring now to FIGS. 5–8, there is shown a stripline layout which is connected to the output of the transformer of the present invention, such as the embodiments shown in FIGS. 1–4. Output terminals 40 and 42 of the transformer are physically extended, as shown in FIG. 5. The extension of the bus structure is formed by several layers of copper 90 and 94 which are separated by an insulating layer 92. Additional insulating layers and conductors can be added to the configuration shown in FIG. 6 as required by the power factor of the circuit. Tabs 53 and 58 are physically formed in conjunction with the extension of transformer output 42 and provide electrical connection to switching elements 44 and 48, respectively, which may be diodes D1 and D3, as shown in FIG. 5, or may be IGBTs, FETs or other switching elements.

Tabs 54 and 60 are similarly formed in conjunction with the extension of output 40 of the transformer shown in FIG. 1, and are used to interconnect the transformer to switching elements 46 and 50 which may be diodes D2 and D4 as shown in FIG. 5, or may be IGBTs, FETs or the like. The use of the laminated structure shown in FIGS. 5 and 6 serves to minimize the parasitic effects that the output wiring of a high frequency, high power transformer would normally suffer.

The thickness of copper elements 90 and 94 are preferably calculated to be the thickness of two skin depths based on the frequency and power output by the transformer. Skin depth is defined as the depth of a conducting material at which the surface current density is reduced by one neper at a given frequency. At high frequencies and high power output a thickness of the conductor 90 or 94 which is greater than two skin depths does not significantly contribute to the conductivity of the output bus 40 or 42, and introduces undesired parasitic capacitance and inductance into the circuit. The thickness of the copper is thus calculated to minimize the losses due to the high frequency and high power being transferred through bus 40 and 42.

Figure 7:
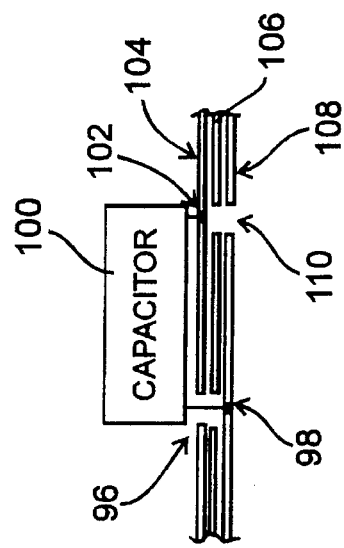
FIG. 7 is a cross sectional view showing the assembly of a capacitor into the bus structure of FIG. 5.

The diodes D1, D2, D3 and D4, shown in FIG. 5, are configured in a full wave rectifier bridge and establish a negative terminal on bus 84 and a positive terminal on bus 82 of the outputs. An array of capacitors 62, 64, 66, 68, 70, 72, 74, 76, 78 and 80 are strategically placed within the planer surface of the positive and negative buses to provide a distributed capacitance which is employed to store energy transferred to bus 82 and 84 by the diode matrix D1–D4. Buses 82 and 84 can be referred to as supply and return buses, respectively, and are bonded to opposite sides of an insulating material as shown in FIG. 7. Fuse 52 protects the power conversion system from overloads from its intended end use.

The leads of capacitors 62–80 are represented by capacitor 100 in FIG. 7. The capacitors (C1–C10) are affixed to the supply and return buses which are formed of the laminated structure shown in FIG. 7. Preferably, bonding capacitor 100 is accomplished by soldering the legs of capacitor 100 to the underlying supply and return bus at points 98 and 102. In order to effectively bond capacitor 100 to the underlying supply and return bus, a first space 96 and a second space 110 are formed in the conductors underlying capacitors 100.

The underlying supply and return buses 84 and 82 are separated by an insulating layer which has a dielectric constant and thickness sufficient to withstand the voltage applied between the power and return buses. In FIG. 7, the buses are shown as a top layer 104 and a bottom layer 108 separated by an insulating material 106. In the embodiment shown in FIG. 7, layer 104 would correspond to return bus 84 and layer 108 would correspond to supply bus 82. It is recognized that the supply and return buses can be readily reversed, and that the supply bus can be routed to top layer 104 and the return bus routed to bottom layer 108.

The geometry of the bus is designed so that the supply currents and the return currents flow in a parallel direction causing the inductive effects of the bus to be cancelled out. Any additional filter components such as capacitors or inductors are integrated into the bus structure in order to maximize their effect on the transient or AC currents which flow through the bus structure.

In this manner, a distributed capacitance is created by the parallel orientation of supply bus 82 and return bus 84 separated by an insulating material (such as insulating material 106). Inductive characteristics of the supply and return bus are controlled by varying the thickness of the bus layers.

Figure 8:
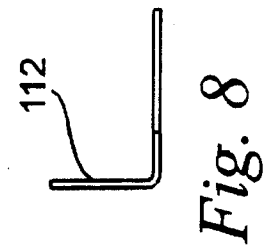
FIG. 8 is a cross sectional view of the bus shown in FIG. 5.

To provide additional strength to bus members 40 and 42 bus members 40 and 42 are bent into an L shaped bracket 112 as shown in FIG. 8.

In one embodiment of the present invention, the width of the positive power bus 82 is approximately 6.5 inches, as is the width of the negative power bus 84. The width of the positive bus and the negative power bus are measured across the area from capacitor 64 to capacitor 80. An insulator located between the positive power bus and the negative power bus preferably has a width of 6.625 inches in order to ensure some overlap of the insulator and prevent tangential arcing along the outer parameter of the positive bus and the negative power bus. The length of the positive power bus and negative power bus is measured from the diodes 44, 46, 48 and 50 to the attachment point of the positive power bus and negative power bus, where reference designators 82 and 84 are indicated. This length in one embodiment is 5 inches. In addition, the cut out or indentation which is most apparent towards the center of the positive and negative power bus is ¾ of an inch shorter on each side than the adjacent tabs. In particular, this means that the length across the center of the positive power bus and negative power bus is approximately 3.5 inches and that the tab of the positive power bus where reference designator 82 is located extends approximately ¾ of an inch beyond the negative power bus. Similarly, the tab where reference designator 84 is indicated extends approximately ¾ of an inch beyond the positive power bus.

There has been described hereinabove a particular embodiment of a novel transformer which is particularly effective at high frequencies. Those skilled in the art may now make numerous uses of and deviations from the above-described embodiment including varying the shape and aspect ratio of the magnetically permeable material without departing from the scope of the inventive concepts which are defined solely by the following claims.

What is claimed is:

1. A high efficiency power conversion system comprising:

a transformer having at least one primary winding and one secondary winding;

at least two power distribution buses electrically connected to said primary winding, said power distribution buses each formed of at least two conductive layers separated by an insulating layer, the thickness of each of the conductive layers not exceeding five skin depths;

at least two output power buses; and two or more switching elements, each of said switching elements coupled between one of said power distribution buses and one of said output power buses.

2. The high efficiency power conversion system as described in claim 1 in which the conductive material is copper and the thickness of the conductive material is approximately two skin depths.

3. The high efficiency power conversion system as described in claim 1 wherein said output power buses comprise at least one positive DC bus electrically connected to at least one of said switching elements, and at least one negative DC bus electrically connected to at least one of said switching elements, said positive DC bus and said negative DC bus each formed of electrically conductive material, said positive DC bus and said negative DC bus located adjacent to each other and separated by a dielectric material, said dielectric material also serving as an insulator between said positive DC bus and said negative DC bus.

4. The high efficiency power conversion system as described in claim 3 in which said switching elements further comprise diodes or rectifiers.

5. The high efficiency power conversion system as described in claim 3 in which said positive DC bus and negative DC bus combine to form a distributed capacitance, said positive DC bus and said negative DC bus configured to allow supply and return currents to flow in a parallel direction to create a distributed inductance, and wherein the distributed inductance of said positive and negative DC bus, and the distributed capacitance created between said positive DC bus and said negative DC bus which is combined with additional, external capacitance electrically connected to said positive DC bus and said negative DC bus combine to form an effective filter suitable for high frequency operation.

6. The high efficiency power conversion system as described in claim 3 in which the positive DC bus and negative DC bus are closely spaced to form a filter capacitor which filters out high frequency signals which are applied across said positive DC bus and said negative DC bus.

7. A high efficiency power conversion system comprising:

a transformer having at least one primary winding and one secondary winding, said primary winding coupled to a high frequency AC voltage source;

at least two laminated power distribution buses, each distribution bus for electrically connecting to a leg of said secondary winding;

a positive DC bus;

a negative DC bus;

one or more switching elements electrically coupled between said power distribution buses and said positive DC bus;

one or more switching elements electrically coupled between said power distribution buses and said negative DC bus; and wherein said laminated power distribution buses, said positive DC bus, and said negative DC bus include means to minimize parasitic effects at high frequency and high power operation of said power conversion system.

8. The high efficiency power conversion system of claim 1 wherein said means to minimize parasitic effects include forming said laminated power distribution buses with at least two conductive layers separated by an insulating layer.

9. The high efficiency power conversion system of claim 8 wherein said conductive layers are copper and the thickness of each conductive layer is approximately two skin depths.

10. The high efficiency power conversion system of claim 9 wherein said laminated power distribution buses includes additional conductive layers separated by an insulating layer as required to effect the efficiency of the power conversion system by increasing or decreasing its power factor.

11. The high efficiency power conversion system of claim 7 wherein said switching elements are rectifiers, said rectifiers configured in a full wave bridge circuit.

12. The high efficiency power conversion system of claim 7 wherein said positive DC bus and said negative DC bus are bonded to opposite sides of an insulating material to form a filter capacitor which filters out high frequency signals which are applied across said positive DC bus and said negative DC bus.

13. The high efficiency power conversion system of claim 12 wherein said positive DC bus and said negative DC bus are combined with additional, external capacitance electrically connected to said positive power bus and said negative power bus to form a distributed capacitance.

14. The high efficiency power conversion system of claim 12 wherein said insulating material has an overlap with said positive power bus and said negative power bus to prevent tangential arcing along outer edges of said positive and negative power buses.

15. The high efficiency power conversion system of claim 12 wherein said positive power bus and said negative power bus have a parallel orientation to reduce inductive characteristics of said power buses.

16. The high efficiency power conversion system of claim 15 wherein said inductive characteristics of said power buses is controlled by varying the thickness of said positive power bus and said negative power bus.

* * * * *